United States Patent
Arnault et al.

(10) Patent No.: US 10,823,236 B2
(45) Date of Patent: Nov. 3, 2020

(54) BALL BEARING, CLUTCH THRUST BEARING DEVICE INCLUDING SUCH A BEARING, AND DRIVELINE SYSTEM INCLUDING SUCH A DEVICE

(71) Applicant: Aktiebolaget SKF, Gothenburg (SE)

(72) Inventors: Benoit Arnault, Saint-Cyr-sur-Loire (FR); Thomas Perrotin, Saint Roch (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/243,221

(22) Filed: Jan. 9, 2019

(65) Prior Publication Data

US 2019/0264756 A1     Aug. 29, 2019

(30) Foreign Application Priority Data

Feb. 28, 2018   (DE) .......................... 10 2018 202 991

(51) Int. Cl.
  *F16C 19/10*   (2006.01)
  *F16D 23/14*   (2006.01)
  *B60K 23/08*   (2006.01)

(52) U.S. Cl.
  CPC .............. *F16D 23/14* (2013.01); *B60K 23/08* (2013.01); *F16C 19/10* (2013.01); *F16C 2361/43* (2013.01)

(58) Field of Classification Search
  CPC ...... F16D 23/14; F16D 23/143; F16D 25/082; F16D 25/12; B60K 23/08; F16C 19/10; F16C 2361/43; F16C 19/163; F16C 33/7886; F16C 2229/00; F16C 2326/06; F16C 33/30; F16C 33/64; F16C 19/02
  See application file for complete search history.

(56) References Cited

U.S. PATENT DOCUMENTS

| | | | | |
|---|---|---|---|---|
| 5,547,058 A * | 8/1996 | Parzefall | ............... | F16D 25/083 192/85.49 |
| 6,719,117 B2 * | 4/2004 | Klopfer | ................. | F16D 13/755 192/98 |
| 6,811,013 B2 * | 11/2004 | Dittmer | ................... | F16D 23/14 192/98 |
| 6,843,354 B2 * | 1/2005 | Dittmer | ................. | F16C 23/084 192/98 |
| 10,208,800 B2 * | 2/2019 | Yano | ..................... | F16C 19/163 |
| 2002/0134640 A1 * | 9/2002 | Klopfer | ................. | F16D 13/755 192/98 |
| 2019/0219100 A1 | 7/2019 | Arnault | | |

* cited by examiner

*Primary Examiner* — David J Hlavka
(74) *Attorney, Agent, or Firm* — Garcia-Zamor Intellectual Property Law; Ruy Garcia-Zamor; Bryan Peckjian

(57) ABSTRACT

A ball bearing and to a clutch thrust bearing device including such a bearing. The invention also relates to a driveline system including such a device, the system being provided to an all-wheel drive driveline system of a motor vehicle. The ball bearing comprises a fixed inner ring able to bear against an axially movable piston, a rotatable outer ring, and one series of balls between the rings. The rotatable outer ring further comprises a shield provided with a folded flange able to bear against a resilient biasing member.

8 Claims, 1 Drawing Sheet

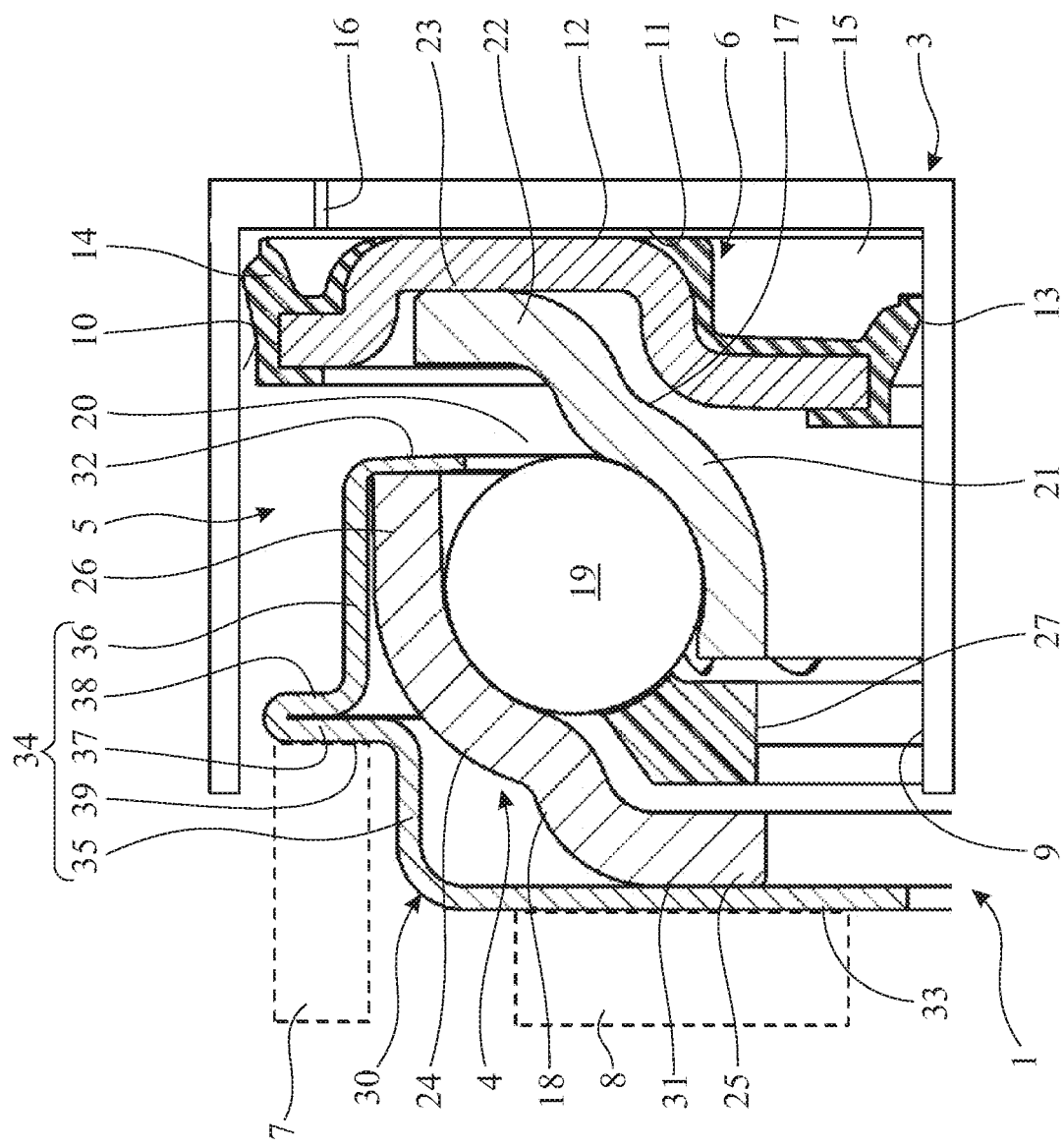

BALL BEARING, CLUTCH THRUST BEARING DEVICE INCLUDING SUCH A BEARING, AND DRIVELINE SYSTEM INCLUDING SUCH A DEVICE

CROSS-REFERENCE TO PRIORITY APPLICATION

This application claims priority to German patent application no. 102018202991.1 filed on Feb. 28, 2018, the contents of which are fully incorporated herein by reference.

TECHNICAL FIELD OF THE PRESENT INVENTION

The present invention relates to a ball bearing and to a clutch thrust bearing device including such a bearing. The invention also relates to a driveline system including such a device, the system being provided to an all-wheel drive driveline system of a motor vehicle.

BACKGROUND

An all-wheel drive driveline system for a motor vehicle generally comprises a primary front drive axle coupled to a secondary or rear drive axle.

When only two wheels of a four-wheel vehicle operate as driving wheels, the rear drive system including the rear drive axle and rear wheels may be disconnected from the front drive system including the front drive axle and front wheels. Furthermore, it could be desirable to disconnect only one of or both rear wheels depending on the operation mode of the motor vehicle.

For this purpose, it is known to provide a rear drive module to the rear drive system, the rear drive module including clutch thrust devices to distribute torque between the front and rear axles, and between the two rear wheels. Clutch thrust devices are also able to disconnect the rear drive system, the wheel being uncoupled to driveline. It is also known rear drive module including two clutches, each of the clutches being able to disconnect one rear wheel from the driveline.

Such rear drive modules enable a motor vehicle with off-road capabilities, and on-road high performances, in particular with efficient stability, efficient dynamic operation, and also low fuel consumption.

Advantageously, the clutch thrust devices are of the well-known multi-plates type and include an axially movable piston disposed within a cavity between a clutch bearing and a housing, the piston cavity being connected to a source of hydraulic fluid which may variably provide pressurized fluid in the cavity to axially move the piston. Clutch thrust devices further include a resilient biasing member exerting an axial preload onto the clutch bearing. The clutch bearing is able to axially move by the piston movement and then actuates a coupling member engaging the plates. It is known to use a clutch bearing with a plurality of needles.

It is desirable to further improve the performances of such rear drive module, in particular by limiting the friction torque within the module and in particular in the clutch bearing to further reduce the vehicle fuel consumption.

BRIEF SUMMARY OF THE PRESENT INVENTION

The aim of the invention is to overcome these drawbacks by proposing a ball bearing, in particular for use in a rear drive module of a driveline system of a motor vehicle, able to transmit an axial force from an axially movable piston to a resilient biasing member, of reduced friction torque, and of easy and low-cost manufacturing process.

To this end, the invention relates to a ball bearing comprising a fixed inner ring, a rotatable outer ring, and one series of balls located in a raceway chamber defined between the rings. The fixed inner ring comprises a toroidal portion of outside toroidal surface forming an inner raceway for the balls, and a radial portion that outwardly radially extends from the toroidal portion, the radial portion having an axial contact surface able to bear against an axially movable piston. The rotatable outer ring comprises a toroidal portion of inner toroidal surface forming an outer raceway for the balls, a radial portion that inwardly radially extends from inner side of the toroidal portion, and an axial portion that axially extends from outer side of the toroidal portion towards the fixed inner ring.

According to the invention, the rotatable outer ring is provided with an annular shield comprising a front shield portion and a rear shield portion that substantially radially extend, the rotatable outer ring being axially clamped between the front and rear shield portions. The shield also comprises an intermediate shield portion that substantially axially extends by connecting the front and rear shield portions, the intermediate shield portion radially covering the rotatable outer ring. The intermediate shield portion is provided with two outwards radial flanges connected together and folded towards one another. One of the radial flanges has an axial contact surface dedicated to bear against a resilient biasing member.

According to further aspects of the invention which are advantageous but not compulsory, such a ball bearing may incorporate one or several of the following features:

The ball bearing further comprises an annular cage comprising a plurality of pockets that receive each a ball.

The inner ring and the outer ring are made of tempered steel.

The rear shield portion radially extends in the raceway chamber so as to retain the balls.

The rear shield axially covers an edge of the axial portion of rotatable outer ring.

The front shield axially covers the radial portion of rotatable outer ring.

The front shield portion comprises an axial contact surface dedicated to bear against a coupling member.

The radial portion of the rotatable outer ring comprises an axial contact surface dedicated to bear against a coupling member.

The radial flanges of the intermediate shield portion are folded in direct contact one another.

The invention also relates to a clutch thrust bearing device comprising an axially movable piston disposed within a cavity between a housing and the ball bearing according to any of the previous embodiments, the piston cavity being connected to a source of hydraulic fluid which may variably provide pressurized fluid in the cavity to axially move the piston, a resilient biasing member exerting an axial preload onto the ball bearing, the ball bearing being able to axially move by the piston movement and then compressing the resilient biasing member, and a coupling member dedicated to engage plates.

Advantageously, the resilient biasing member is a wavy spring.

The invention also relates to a driveline system of a motor vehicle comprising such a clutch thrust bearing device according to the invention for selectively connecting or disconnecting at least one wheel from the driveline system.

Advantageously, the driveline system comprises a front drive system including a front drive axle and front wheels, and a rear drive system including a rear drive axle, a rear drive module and rear wheels, the rear drive module being provided with clutch thrust bearing devices according to the invention in series, each being able to selectively connect or disconnect one of the rear wheels.

BRIEF DESCRIPTION OF THE DRAWINGS

The invention will now be explained in correspondence with the annexed unique FIGURE, as illustrative example, without restricting the object of the invention. The FIGURE is an axial section of a clutch thrust bearing device comprising a ball bearing according the invention.

DETAILED DESCRIPTION

The clutch thrust bearing device 1 is advantageously integrated in a driveline system of a motor vehicle, not represented. The clutch thrust bearing device 1 is essentially annular and centered on a central axis.

The clutch thrust bearing device 1 comprises a fixed housing 3, a ball bearing 4, the fixed housing 3 and ball bearing 4 defining a cavity 5 wherein an axially movable piston 6 is arranged, a resilient biasing member 7 shown by way of a dot-dashed line, for example a wavy spring, and a coupling member 8 shown by way of a dot-dashed line and dedicated to engage plates.

The housing 3 is fixed, and advantageously is a part of a rear drive module provided to the driveline system. The housing comprises an annular cavity 5 centered on the central axis. The cavity 5 is defined between two lateral walls 9, 10, and a bottom surface 11, where the cavity 5 is axially open to the ball bearing 4.

The piston 6 is annular, is centered on the central axis, and is arranged within the cavity 5 of housing 3. The piston 6 comprises a substantially radial portion 12 extending radially between the two lateral walls 9, 10 of cavity 5. Advantageously, the piston 6 further comprises inner sealing means 13 provided to inner bore of radial portion 12, the sealing means being provided with a sealing lip in sliding contact with the lateral wall 9 of cavity 5. The piston also comprises outer sealing means 14 provided to outer side of radial portion 12, the sealing means being provided with a sealing lip in sliding contact with the lateral wall 10 of cavity 5.

The piston 6, the lateral walls 9 and 10 and the bottom surface 11 collectively define a sealed cavity 15. At least one channel 16 is provided through the housing 3 so as to connect the sealed cavity 15 with a source of hydraulic fluid (not represented) which may variably provide pressurized fluid in the sealed cavity 15 to axially move the piston 6.

In the present embodiment, the substantially radial portion 12 of piston 6 has a shape with a recess adapted to the ball bearing 4. Alternatively, the substantially radial portion 12 may have any other suitable shape.

The ball bearing 4 is annular and centered on the central axis. The ball bearing 4 is at least partly arranged in the cavity 5 of housing 3, the piston 6 being axially interposed between the bottom surface 11 of the cavity 5 and the ball bearing 4. The lateral walls 9, 10 of cavity 5 permit the lateral guidance of the ball bearing 4.

The ball bearing 4 comprises a fixed inner ring 17, a rotatable outer ring 18, and one series of balls 19 located in a raceway chamber 20 defined between the rings 17, 18. A ball bearing 4 provided with balls 19 as rolling elements between rings 17, 18 is of reduced friction torque compared to other types of rolling bearings, provided with rollers or needles.

The fixed inner ring 17 comprises a toroidal portion 21 of outside toroidal surface forming an inner raceway for the balls 19, and a radial portion 22 that outwardly radially extends from the toroidal portion 21. The radial portion 22 has an axial contact surface 23 bearing against the axially movable piston 6. The ball bearing 4 is set in axial movement by the transmission of the movement of piston 6 to the axial contact surface 23 of fixed inner ring 17.

The rotatable outer ring 18 comprises a toroidal portion 24 of inner toroidal surface forming an outer raceway for the balls 19, a radial portion 25 that outwardly radially extends from an inner side of the toroidal portion 24, and an axial portion 26 that axially extends from outer side of the toroidal portion 24 towards the fixed inner ring 17.

Advantageously, the ball bearing 4 further comprises an annular cage 27 comprising a plurality of pockets that receive each ball 19. The balls 19 are then circumferentially equally spaced and held.

According to the invention, the rotatable outer ring 18 is provided with an annular shield 30.

The annular shield 30 comprises a front shield portion 31 and a rear shield portion 32 that are annular around the central axis, and both substantially radially extend. The rotatable outer ring 18 is axially clamped between the front shield portion 31 and rear shield portion 32. More precisely, the front shield portion 31 is in axial contact against the radial portion 25 of rotatable outer ring 18 on a front axial side. The rear shield portion 32 is in axial contact against an edge of axial portion 26 of rotatable outer ring 18 on a rear axial side that is opposite to the front axial side.

Advantageously, the front shield portion 31 fully covers the radial portion 25 of rotatable outer ring 18, and has an axial contact surface 33 bearing against the coupling member 8 dedicated to engage plates of the clutch thrust device 1.

As an alternate not shown, the front shield portion 31 may not fully cover the radial portion 25 of ring 18. As another alternate, the front shield portion 31 may cooperate with the outer surface of the toroidal portion 21 of ring 18. As another alternate, the radial portion 25 of rotatable outer ring 18 may have an axial contact surface 33 bearing against the coupling member 8 dedicated to engage plates of the clutch thrust device 1.

Advantageously, the rear shield portion 32 radially extends in the raceway chamber 20 so as to retain the balls 19.

The annular shield 30 also comprises an intermediate shield portion 34 that is annular around the central axis, and that substantially axially extends by connecting the front shield portion 31 and the rear shield portion 32. The intermediate shield portion 34 radially covers the rotatable outer ring 18. The rotatable outer ring 18 is then arranged within the annular shield 30 axially and radially.

The intermediate shield portion 34 is provided with two axial portions 35, 36 that are connected one to another by a radial flange, the flange being formed by two outwards radial flange portions 37 and 38 connected together and folded over one another. More precisely, the first axial portion 35 is arranged on the front axial side with respect to the flange, and is connected to the radial front shield portion 31. The second axial portion 36 is arranged on the rear axial side with respect to the flange, on the opposite to the first axial portion 35, and is connected to the radial rear shield portion 32. The first radial portion 37 radially outwardly extends from the first axial portion 35, and the second radial portion 38 radially outwardly extends from the second axial portion 36, the radial flange portions 37 and 38 being connected together. Both portions 37 and 38 extend radially in the same direction and are folded over one another. The intermediate shield portion 34 extends substantially axially between the front and rear shield portions 31, 32, and is provided with a flange formed by the radial flange portions 37, 38.

Advantageously, radial flanges 37, 38 of the intermediate shield portion 34 are folded in direct contact one another. Alternatively, the flanges are folded towards one another without contact.

The first radial portion 37 has an axial surface 39 directed towards the front axial side, the surface 39 forming an axial contact surface bearing against the resilient biasing member 7.

The first axial portion 35 permits to center and to guide the resilient biasing member 7.

Advantageously, the first axial portion 35 provided on the front axial side of intermediate shield portion 34 has a diameter smaller than the diameter of the second axial portion 36 provided on the axially opposite rear side. This arrangement permits to provide an increase radial length for the axial contact surface 39 with the resilient biasing member 7.

Thanks to the invention, the axial movement of the piston 6 can be transferred into the compression of the resilient biasing member 7 by the intermediate of the axial contact surface 23 of the fixed inner ring 17, the balls 19, the rotatable ring 18, the annular shield 30 by the intermediate of the contact between the radial portion 25 of rotatable outer ring 18 with the front shield portion 31, and then the axial contact surface 39 of intermediate shield portion 34 connected to the front shield portion 31, successively.

Advantageously, the inner ring 17 and the outer ring 18 are made of tempered steel. The rings 17, 18 are advantageously stamped from a metal blank sheet and are of simple and cost effective construction. The clutch thrust bearing device does not require additional element or elements of complex shape to ensure the connection and disconnection functions.

The clutch thrust bearing device 1 works as followed:

The axial movement of the piston 6 is transferred to the ball bearing 4, and the connection/disconnection of the rear drive module to the driveline system is actuated by the supplying of pressurized fluid in the sealed chamber 15.

When pressurized fluid in supplied in the sealed chamber 15 through channel 16 of housing 3, the piston 6 is pushed by the fluid. Piston 6 transmits a forward axial movement to the ball bearing 4 by the intermediate of contact surface 23 of fixed inner ring 17. Contact surface 33 of front shield portion 31 of annular shield 30 actuates the coupling member 8 that engages plates (not shown) to connect one wheel to the driveline system of the vehicle. The resilient biasing member 7 is axially compressed by the ball bearing 4 axial forward movement, by the intermediate of the contact surface 39 of folded flange 37, 38 of intermediate shield portion 34.

When pressurized fluid is not supplied anymore to the sealed chamber 15, the resilient biasing member 7 pushes the ball bearing 4 into a rearward axial movement, by the intermediate of the surface 39 of flange 37, 38. The contact surface 33 of front shield portion 31 does not actuate anymore the coupling member 8 to disconnect one wheel to the driveline system. The piston 6 is pushed rear to its initial position by the intermediate of contact surface 23 of inner ring 17, the fluid in sealed chamber 15 being removed through channel 16.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved ball bearing.

Moreover, various features of the above-described representative examples, as well as the various independent and dependant claims below, may be combined in ways that are not specifically and explicitly enumerated in order to provide additional useful embodiments of the present teachings.

What is claimed is:

1. A ball bearing comprising:
    a fixed inner ring comprising a toroidal portion of outside toroidal surface forming an inner raceway for balls, and a radial portion that outwardly radially extends from the toroidal portion, the radial portion having an axial contact surface able to bear against an axially movable piston;
    a rotatable outer ring comprising a toroidal portion of inner toroidal surface forming an outer raceway for balls, a radial portion that inwardly radially extends from inner side of the toroidal portion, and an axial portion that axially extends from outer side of the toroidal portion towards the fixed inner ring; and
    one series of balls located in a raceway chamber defined between the rings,
    wherein the rotatable outer ring is provided with an annular shield, the annular shield comprises:
        a front shield portion and a rear shield portion that substantially radially extend, the rotatable outer ring being axially clamped between the front and rear shield portions, and
        an intermediate shield portion that substantially axially extends by connecting the front and rear shield portions, that radially covers the rotatable outer ring, and that is provided with two outwards radial flanges connected together and folded towards one another, one of the radial flanges having an axial contact surface dedicated to bear against a resilient biasing member; and
    wherein the rear shield portion radially extends in the raceway chamber so as to retain the balls.

2. The ball bearing according to claim 1, wherein the inner ring and the outer ring are made of tempered steel.

3. A ball bearing comprising:
    a fixed inner ring comprising a toroidal portion of outside toroidal surface forming an inner raceway for balls, and a radial portion that outwardly radially extends from the toroidal portion, the radial portion having an axial contact surface able to bear against an axially movable piston;
    a rotatable outer ring comprising a toroidal portion of inner toroidal surface forming an outer raceway for balls, a radial portion that inwardly radially extends from inner side of the toroidal portion, and an axial portion that axially extends from outer side of the toroidal portion towards the fixed inner ring; and
    one series of balls located in a raceway chamber defined between the rings, wherein the rotatable outer ring is provided with an annular shield, the annular shield comprises:
  a front shield portion and a rear shield portion that substantially radially extend, the rotatable outer ring being axially clamped between the front and rear shield portions, and
  an intermediate shield portion that substantially axially extends by connecting the front and rear shield portions, that radially covers the rotatable outer ring, and that is provided with two outwards radial flanges connected together and folded towards one another, one of the radial flanges having an axial contact surface dedicated to bear against a resilient biasing member; and
wherein the front shield portion comprises an axial contact surface dedicated to bear against a coupling member.

4. The ball bearing according to claim 3, wherein the radial flanges of the intermediate shield portion are folded in direct contact one another.

5. A clutch thrust bearing device comprising:
a housing,
a ball bearing comprising:
  a fixed inner ring comprising a toroidal portion of outside toroidal surface forming an inner raceway for balls, and a radial portion that outwardly radially extends from the toroidal portion, the radial portion having an axial contact surface able to bear against an axially movable piston;
  a rotatable outer ring comprising a toroidal portion of inner toroidal surface forming an outer raceway for balls, a radial portion that inwardly radially extends from inner side of the toroidal portion, and an axial portion that axially extends from outer side of the toroidal portion towards the fixed inner ring; and
  one series of balls located in a raceway chamber defined between the rings,
  wherein the rotatable outer ring is provided with an annular shield, the annular shield comprising:
    a front shield portion and a rear shield portion that substantially radially extend, the rotatable outer ring being axially clamped between the front and rear shield portions, and
    an intermediate shield portion that substantially axially extends by connecting the front and rear shield portions, that radially covers the rotatable outer ring, and that is provided with two outwards radial flanges connected together and folded towards one another, one of the radial flanges having an axial contact surface dedicated to bear against a resilient biasing member;
  an axially movable piston disposed within a cavity between the housing and the ball bearing, the piston cavity being connected to a source of hydraulic fluid which may variably provide pressurized fluid in the cavity to axially move the piston,
  a resilient biasing member exerting an axial preload onto the ball bearing, the ball bearing being able to axially move by the piston movement and then compressing the resilient biasing member, and
  a coupling member dedicated to engage plates.

6. The clutch thrust bearing device according to claim 5, wherein the resilient biasing member is a wavy spring.

7. The clutch thrust bearing device according to claim 5 for selectively connecting or disconnecting at least one wheel from the driveline system, wherein the clutch thrust bearing device is integrated into a driveline system of a motor vehicle.

8. The clutch thrust bearing device according to claim 7, the driveline system further comprising a front drive system including:
a front drive axle and front wheels, and
a rear drive system including a rear drive axle,
a rear drive module and rear wheels,
wherein the rear drive module is provided in series with clutch thrust bearing devices, each clutch thrust bearing device being able to selectively connect or disconnect one of the rear wheels.

* * * * *